United States Patent [19]

Lebourg

[11] Patent Number: 4,580,591
[45] Date of Patent: Apr. 8, 1986

[54] LIQUID FEED SYSTEMS, IN PARTICULAR FOR FUEL FOR AERONAUTICAL ENGINES

[75] Inventor: Serge Lebourg, Bordeaux, France

[73] Assignee: Avions Marcel Dassault-Breguet Aviation, Vaucresson, France

[21] Appl. No.: 489,784

[22] Filed: Apr. 29, 1983

[30] Foreign Application Priority Data

Apr. 30, 1982 [FR] France ............... 82 07508

[51] Int. Cl.⁴ .............................................. F16T 1/00
[52] U.S. Cl. ...................................... 137/171; 55/182
[58] Field of Search ................ 137/171; 55/182, 189, 55/190, 192

[56] References Cited

U.S. PATENT DOCUMENTS

| | | | |
|---|---|---|---|
| 1,364,770 | 1/1921 | Lindberg | 137/38 |
| 2,860,648 | 11/1958 | Harrison | 137/38 |
| 3,130,022 | 4/1964 | Clark | 55/182 |
| 3,833,013 | 9/1974 | Leonard | 137/171 |
| 3,933,448 | 1/1976 | Di Peri | 55/182 |
| 4,243,065 | 1/1981 | Garrett | 137/171 |
| 4,388,944 | 6/1983 | Honma et al. | 137/171 |

FOREIGN PATENT DOCUMENTS 914386 10/1946 France.
500331 2/1937 United Kingdom.
580006 8/1946 United Kingdom.

Primary Examiner—Henry C. Yuen
Assistant Examiner—John Kwon
Attorney, Agent, or Firm—Watson, Cole, Grindle & Watson

[57] ABSTRACT

An air arrester device that can be connected into the fuel line of an airplane to interrupt the passage of a bubble of air moving through the fuel line, the device including a vertically oriented elongated container which includes an inlet duct connected to its lower end and an outlet duct which extends downwardly through its upper end and into the interior of the container, the outlet duct including at least one intake port located at about half way along the length of the container to enable fuel in the container to flow into the outlet duct and upwardly out of the container. Under negative G conditions an air bubble which has passed into the container via the inlet duct will be located below the intake ports while under normal conditions it will be located above the intake ports.

8 Claims, 6 Drawing Figures

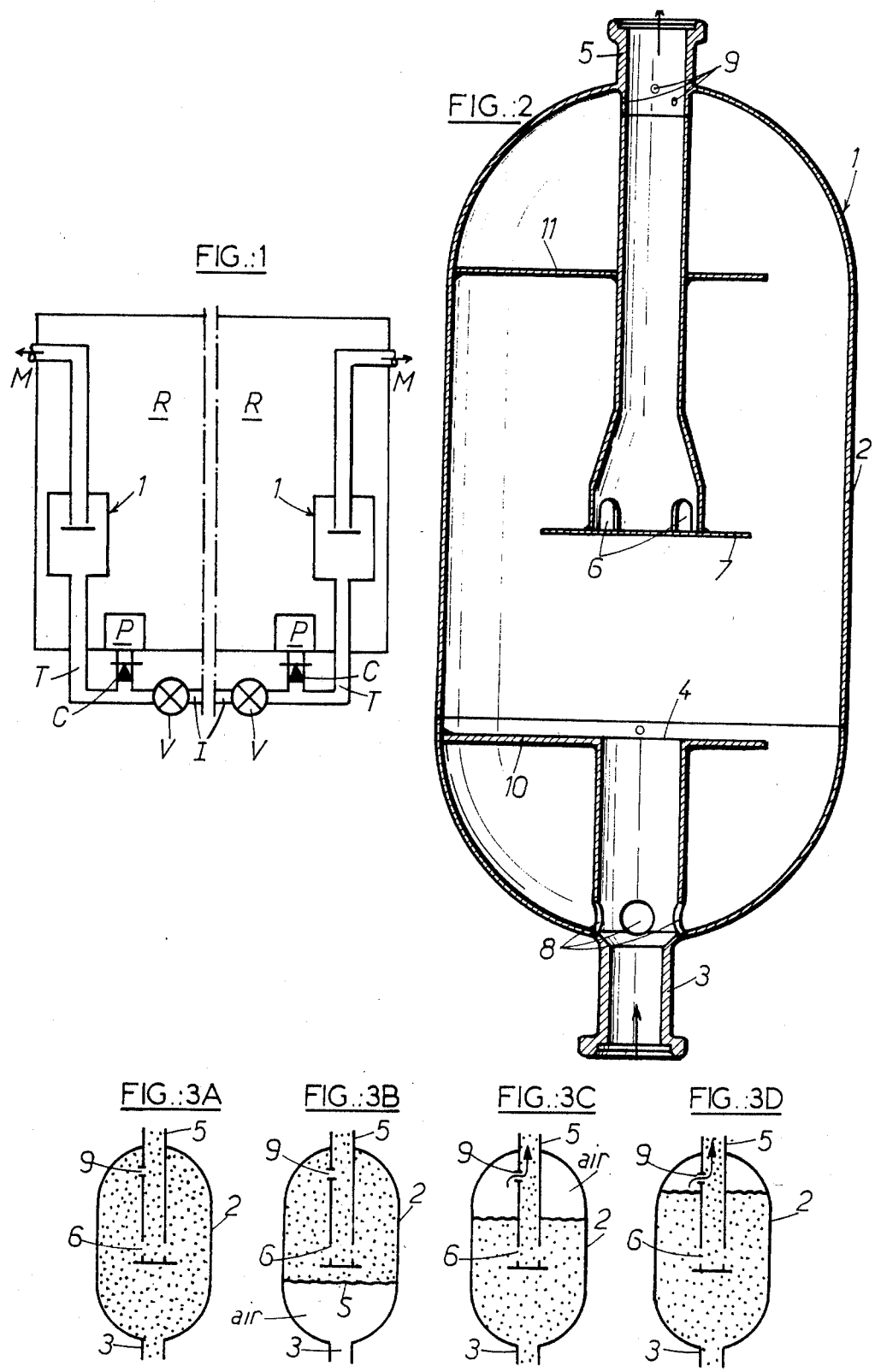

LIQUID FEED SYSTEMS, IN PARTICULAR FOR FUEL FOR AERONAUTICAL ENGINES

BACKGROUND OF THE INVENTION

Certain jet engines prove to be very sensitive to momentary interruptions to their fuel feed, such as when is injected air into the burners thereof. This can occur during flight under negative G or load factor when the body of liquid fuel contained in the fuel tank surges upwardly, thus uncovering the pumping outlet which, being located at the bottom of the fuel tank, is then no longer immersed in the liquid. As such, air will be sucked into the fuel like.

SUMMARY OF THE INVENTION

The present invention undertakes to remedy such a state of affairs by interposing in the feed pipe of the engine a container—hereinafter referred to as a "bottle"—which contains a small fuel reserve and is designed to hold back, should the occasion arise, the air coming from the pumping action, and to separate it from the noted reserve, the fuel continuing to be routed towards the engine. When things return to normal, i.e. when the pumping of fuel resumes, the air that has been retained in the bottle and which has accumulated there, is evacuated from it gradually by induction into the fuel flow, by venturi effect.

According to a preferred embodiment of the present invention, the bottle which, being joined to the feed pipe, takes the place of a section of the latter, is rendered entirely fluid-tight vis-a-vis the outside so that it can have an overall effect identical with that of the section of pipe that it replaces.

The following description, with reference to the accompanying drawings, given by way of a nonrestrictive example, will make it readily comprehensible how the invention can be implemented.

BRIEF DESCRIPTION OF THE DRAWINGS

FIG. 1 is a diagrammatic representation of the system showing the location and connection of the bottle that constitutes the object of the present invention, FIG. 2 is a vertical section, on a larger scale, of an embodiment of the bottle in accordance with the present invention, and FIGS. 3A, 3B, 3C and 3D illustrate four successive phases of operation of such a bottle.

DETAILED DESCRIPTION OF THE PREFERRED EMBODIMENT

FIG. 1 shows a very diagrammatic representation of two separate fuel tanks R, fitted in each case at the bottom, as is customary, with a pump P—commonly called a "booster"—delivering, via a nonreturn valve C, into a feed pipe T which terminates at the fuel injection system of the engine M. To prevent failures, the two circuits are interconnected by an intercommunication duct I provided with valves V which are opened in case of breakdown of one of the pumps P, the supply then being ensured by the other pump drawing from its tank R, without there being a transfer from one tank to the other, because of the non-return valve C.

In accordance with the present invention, one interposes in each of the feed pipes T a bottle 1 which, in the example illustrated, is located inside the tank R while remaining isolated from the latter's contents.

Such a bottle 1 is shown in detail in FIG. 2. It consists essentially of a fluid-tight oblong container 2 with a more or less vertical central axis and with a smaller volume than the coresponding tank R. It is joined to the feed pipe T, on the one hand at the bottom, by an inlet duct 3 passing through the bottom of the container 2 which opens into the container via an open end 4, and, on the other hand, at the top, by an outlet duct 5 passing through the top of the container 2 and extending as far as approximately the mid-point of the latter to open there via wide catchment ports 6 shielded behind a wide horizontal overlapping screen 7 fulfilling the role of a deflector. It should be noted that the inlet duct 3 communicates with the lowest part of the container 2 via wide apertures 8, while for its part the outlet duct 5 communicates with the topmost part of the container 2 via small holes 9.

In order to allow for the mechanical forces that may be exerted on the immersed portions of the ducts 3 and 5 by the shoshing of liquid enclosed in the container 2, the former are braced by arms or perforated plates 10 and 11.

Each bottle 1 constructed and fitted in this way functions in the following manner:

1. In the normal mode of operation under positive G, the bottle is full of fuel (see FIG. 3A) and it is therefore in this state that it will be at the moment of sudden transition to negative G, i.e., at the time t=0 of this condition of flight under negative load factor, when the liquid fuel in the tank R surges to the top of the latter and the pump P begins to ingest—and thus to deliver—air.

2. An air bubble forms, then, which progresses along the tube T and passes via the inlet duct 3 into the bottom of the container 2 (see FIG. 3B). The dimensions of the latter, and also the height at which the catchment ports 6 of the outlet duct 5 are located, are determined, taking account of consumption and the foreseeable duration of flight under negative load factor, for example t=5 seconds, in such a way as to ensure that the level of the interface S between the air and the liquid does not reach the catchment ports 6 which remain immersed in the fuel, shielded from the air by the deflector screen 7. Putting it another way, if (as has been said) the catchment ports 6 are located half-way up the container 2, the ultimate volume occupied by the air in the bottom of the latter will be less than half its capacity. Thus, for the duration of this whole phase of flight under negative G, the engine continues to be fed with fuel, the air bubble being confined at the bottom of the container 2.

3. As soon as the normal mode of flight under positive G has resumed, the volume of air passes from the bottom to the top of the container 2 (see FIG. 3C), but as this volume is less than half the capacity of the latter and the catchment ports 6 are located halfway up, they will continue to remain immersed in the fuel which the pump P then starts to deliver again.

4. The body of air confined in the top of the container 2 will then be reabsorbed progressively, starting from this reversion to normal, being evacuated slowly through the small holes 9 by induction or the venturi effect exerted by the flow of fuel in the outlet duct 5 (see FIG. 3D).

The bottle 1 returns, for example at t=30 seconds, to its original state in which it is filled with fuel (see FIG. 3A) and it is then ready for a possible new phase of flight under negative G.

It is self-evident that the embodiment described is no more than an example and that it could be modified, notably by the substitution of technically equivalent items, without thereby going outside the scope of the invention as defined by the appended claims. Thus, in particular, the flat horizontal screen 7 of this example could with advantage be replaced by a cup with its concave side facing upwardly, which would have the effect of allowing the level of the interface S (FIG. 3B) to rise above the level of the catchment ports 6, without any air getting in even then (for that, the level of interface S would have to reach the level of the upper edge of the cup).

Furthermore, the device described could be applied in other fields where it is desired to separate two fluids of differing densities while making sure of their proportional reinjection.

I claim:

1. An arrester device for use in a piping system which is designed in use for the continuous flow of liquid under prolonged normal conditions but along which, under transient abnormal condition, a coherent mass of air can occassionally travel in the form of a bubble constituting a discontinuity in the flow of liquid, the arrester device being arranged to check the progress of said bubble along said piping system, and said device comprising a reservoir in the form of a container defining a substantial reserve volume which, the use, is full of liquid under said normal conditions, said reservoir being designed and arranged for momentarily trapping therein any such bubble whenever the latter arrives at said inlet connection, upon the occurrence of said transient abnormal conditions and liquid being meanwhile delivered through said outlet connection from said reservoir, said reservoir being sealingly connected in said piping system by means of an upstream inlet connection at its bottom and a downstream outlet connection at its top, said outlet connection comprising a downward tubular extension projecting inside said container, terminating with at least one intake port located at substantially midheight of said container, whereby said intake port is submerged in said liquid so long as at least half of said liquid reserve has not been consumed, irrespective of whether the liquid mass in said container is concentrated at the top or at the bottom thereof, said tubular extension of said outlet connection being provided with at least one small throughbore formed adjacent the top of said reservoir for exerting an ejector effect around said tubular extension due to induction of liquid flow therethrough, whereby the air thus trapped in said reservoir is gradually eliminated upon resumption of said normal conditions.

2. An air arrester device according to claim 1, wherein said container is of oblong shape and has a normally generally vertical axis, whereby said outlet connection is substantially immediately above said inlet connection.

3. An air arrester device according to claim 1, including a liquid deflector baffle sheltering said intake port.

4. An air arrester device according to claim 1, including a strut bracing said tubular extension projecting inside said container to the wall thereof.

5. An air arrester device according to claim 1, wherein said liquid is a fuel to be supplied by means of said piping system to a combustion chamber of an aircraft jet engine.

6. An air arrester device according to claim 5, wherein said reservoir is housed within a fuel tank and is connected to the discharge end of a fuel pump arranged to suck fuel from said tank.

7. An air arrester device for use in a piping system in which a continuous flow of liquid is to be carried, the air arrester device being capable of interrupting the passage of an occasional bubble of air having a maximum predetermined volume therethrough while concurrently enabling a continuous flow of liquid therethrough, the device comprising a container having an interior of a certain volume and defining an upper end and a lower end, an inlet duct sealingly connected to the lower end of said container to enable liquid and an occasional bubble of air having a maximum predetermined volume to pass into the interior of said container, and an outlet duct sealingly passing through the upper end of said container and having a portion which extends at least halfway to the lower end of said container, said portion of said outlet duct including at least one outlet port therein near the halfway point between the upper and lower ends of said container, each said outlet port enabling the liquid in the container to flow into the outlet duct and upwardly out of the container, said bubble of air entering the lower end of said container via said inlet duct moving to the upper end of said container under normal conditions and remaining in the lower end of said container under negative G conditions, the maximum predetermined volume of the air bubble being determined by the interior volume of said container above and below the nearest outlet port, and at least one small hole in said portion of said outlet duct near the upper end of said container to enable an air bubble located in the upper end of said container to be slowly absorbed into the liquid passing out of the container through the outlet duct.

8. An air arrester device according to claim 7, wherein the portion of said outlet duct within the container includes a free end, and wherein a horizontally-oriented shield screen is connected to said free end to reduce the chance of any air flowing into any said outlet port.

* * * * *